US011143868B2

(12) United States Patent
Seo et al.

(10) Patent No.: US 11,143,868 B2
(45) Date of Patent: Oct. 12, 2021

(54) 3-DIMENSIONAL IMAGE DISPLAY APPARATUS AND METHOD OF PROVIDING EXPANDED VIEWING WINDOW

(71) Applicant: SAMSUNG ELECTRONICS CO., LTD., Suwon-si (KR)

(72) Inventors: Wontaek Seo, Yongin-si (KR); Geeyoung Sung, Daegu (KR); Sunil Kim, Seoul (KR); Bongsu Shin, Seoul (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 16/132,648

(22) Filed: Sep. 17, 2018

(65) Prior Publication Data

US 2019/0324272 A1 Oct. 24, 2019

(30) Foreign Application Priority Data

Apr. 24, 2018 (KR) .................. 10-2018-0047320

(51) Int. Cl.
*G02B 27/01* (2006.01)
*G02B 27/00* (2006.01)
(52) U.S. Cl.
CPC ..... *G02B 27/0172* (2013.01); *G02B 27/0093* (2013.01); *G02B 2027/0174* (2013.01); *G02B 2027/0178* (2013.01)
(58) Field of Classification Search
None
See application file for complete search history.

(56) References Cited

U.S. PATENT DOCUMENTS

| 8,325,108 | B2 | 12/2012 | Min et al. |
| 9,529,194 | B2 | 12/2016 | Yoo et al. |
| 2011/0199459 | A1 | 8/2011 | Barenburg et al. |
| 2013/0208328 | A1 | 8/2013 | Chae et al. |
| 2015/0085331 | A1* | 3/2015 | Chae ............... G03H 1/2294 359/9 |
| 2015/0234350 | A1 | 8/2015 | Park et al. |
| 2015/0319427 | A1 | 11/2015 | Wu |
| 2016/0033771 | A1* | 2/2016 | Tremblay ........... G02B 26/10 345/8 |
| 2016/0202593 | A1 | 7/2016 | Kroll et al. |
| 2016/0216691 | A1 | 7/2016 | Kim et al. |

(Continued)

FOREIGN PATENT DOCUMENTS

| KR | 10-2015-0145219 A | 5/2001 |
| KR | 10-2011-005494 A | 1/2011 |

(Continued)

*Primary Examiner* — Amare Mengistu
*Assistant Examiner* — Sarvesh J Nadkarni
(74) *Attorney, Agent, or Firm* — Sughrue Mion, PLLC

(57) ABSTRACT

A three-dimensional (3D) image display apparatus is provided. The apparatus includes a plurality of light sources; a spatial light modulator configured to modulate light from the plurality of light sources according to 3D image information; and a focusing optical system configured to focus an image formed by the spatial light modulator onto a focal plane. The plurality of light sources may be arranged such that multiple focal points, respectively corresponding to the plurality of light sources, are formed on the focal plane near a pupil of a user.

19 Claims, 13 Drawing Sheets

(56) References Cited

U.S. PATENT DOCUMENTS

| | | | |
|---|---|---|---|
| 2016/0238845 A1* | 8/2016 | Alexander | G03H 1/2645 |
| 2017/0102541 A1* | 4/2017 | Tremblay | G02B 5/32 |
| 2017/0293147 A1* | 10/2017 | Tremblay | G02B 27/0172 |
| 2018/0129166 A1 | 5/2018 | Seo et al. | |
| 2018/0364643 A1* | 12/2018 | Kroll | G03H 1/0808 |

FOREIGN PATENT DOCUMENTS

| | | |
|---|---|---|
| KR | 10-2013-0099622 A | 9/2013 |
| KR | 10-2015-0033501 A | 4/2015 |
| KR | 10-2015-0097029 A | 8/2015 |
| KR | 10-2016-0092716 A | 8/2016 |

* cited by examiner

3-DIMENSIONAL IMAGE DISPLAY APPARATUS AND METHOD OF PROVIDING EXPANDED VIEWING WINDOW

CROSS-REFERENCE TO RELATED APPLICATION

This application claims priority from Korean Patent Application No. 10-2018-0047320, filed on Apr. 24, 2018, in the Korean Intellectual Property Office, the disclosure of which is incorporated herein in its entirety by reference.

BACKGROUND

1. Field

Apparatuses and methods consistent with example embodiments relate to a 3-dimensional (3D) image display apparatus and method of providing an expanded viewing window.

2. Description of the Related Art

A head-mounted display (HMD) is worn by a user in front of the eyes like glasses and allows the user to see an image displayed on the HMD. HMDs have been commercially available and widely used in the entertainment industry. Also, HMDs have been developed for applications in medicine, education, and other areas.

HMDs are also used in various applications that provide virtual reality (VR), augmented reality (AR), and the like.

In the field of HMDs, there is a continuous search for a method of broadening an area (a viewing window, an eye box) in which a user may observe an image.

SUMMARY

One or more example embodiments may provide a 3-dimensional (3D) image display apparatus and method of providing an expanded viewing window.

Additional example aspects and advantages will be set forth in part in the description which follows and, in part, will be apparent from the description, or may be learned by practice of the presented example embodiments.

According to an aspect of an example embodiment, a three-dimensional (3D) image display apparatus includes a plurality of light sources arranged to form a respective plurality focal points at different positions on a predetermined focal plane, wherein one or more of the plurality of light sources are selectively driven as a driving light source; a spatial light modulator configured to modulate light from the plurality of light sources according to 3D image information; a focusing optical system configured to focus an image formed by the spatial light modulator on the focal plane; and a processor configured to select and drive at least one of the plurality of light sources as the driving light source and to control a modulation signal applied to the spatial light modulator.

A distance between the respective plurality of focal points may be equal to or greater than a pupil size.

A distance between the respective plurality of focal points may be between about 2 mm and about 10 mm.

The plurality of light sources may be configured to provide light in same wavelength band.

The focusing optical system may be a Maxwellian view optical system configured to focus image information at one point on the user's pupil.

The focusing optical system may include a first lens and a second lens; and a spatial filter disposed between the first lens and the second lens.

The processor may be configured to make the plurality of light sources sequentially blink to form the respective plurality of focal points on the predetermined focal plane and to select, as the driving light source, the one of the plurality of light sources that forms a focal point closest to a pupil position of a user.

The 3D image display apparatus may further include an eye tracking sensor, and the processor may be configured to select the driving light source based on a detection signal of the eye tracking sensor.

The processor may be configured to select the driving light source according to an input signal of the user.

The processor may be configured to control the driving light source among the plurality of light sources to be in an ON state, control the remaining ones of the plurality of light sources to be in an OFF state, and control the spatial light modulator to form a 3D image using light of the driving light source.

The driving light source may include a first driving light source and a second driving light source, and the processor may be configured to make the first driving light source and the second driving light source sequentially blink and control the spatial light modulator to form different images in synchronization with blinking of the first and second driving light sources.

The 3D image display apparatus may further include a beam steering device configured to adjust a position of at least one of the respective plurality of focal points.

The plurality of light sources, the spatial light modulator, and the focusing optical system may be configured to move together to adjust positions of the respective plurality of focal points.

The 3D image display apparatus may be a head-mounted display (HMD).

According to an aspect of another example embodiment, a three-dimensional (3D) image display method includes arranging a plurality of light sources to form a respective plurality of focal points at different positions on a predetermined focal plane; selectively driving the plurality of light sources and modulating light from the driven plurality of light sources according to 3D image information and focusing the light on positions of the respective plurality of focal points; selecting, as a driving light source, a light source that forms a focal point on a pupil position of a user among the plurality of light sources as a driving light source; and forming and displaying a 3D image using light of the driving light source by placing the driving light source among the plurality of light sources to be in an ON state and remaining ones of the plurality of light sources to be in an OFF state.

The 3D image display method may further include tracking a pupil position of the user, and the selecting may include selecting the driving light source based on a pupil position tracking result.

The 3D image display method may further include receiving an input signal of the user, and the selecting may include selecting the driving light source according to the input signal.

The selecting may include a first driving light source and a second driving light source as the driving light source, and the displaying may include making the first driving light source and the second driving light source sequentially blink and forming different respective images in synchronization with blinking of the first and second driving light sources.

The focusing may be performed by using a Maxwellian view optical system configured to focus image information at a point one the user's pupil.

The 3D image display method may further include finely adjusting a position of at least one of the respective plurality of focal points when no light source forms a focal point at the pupil position of the user.

BRIEF DESCRIPTION OF THE DRAWINGS

These and/or other example aspects and advantages will become apparent and more readily appreciated from the following description of example embodiments, taken in conjunction with the accompanying drawings in which.

DETAILED DESCRIPTION

Figure 1:
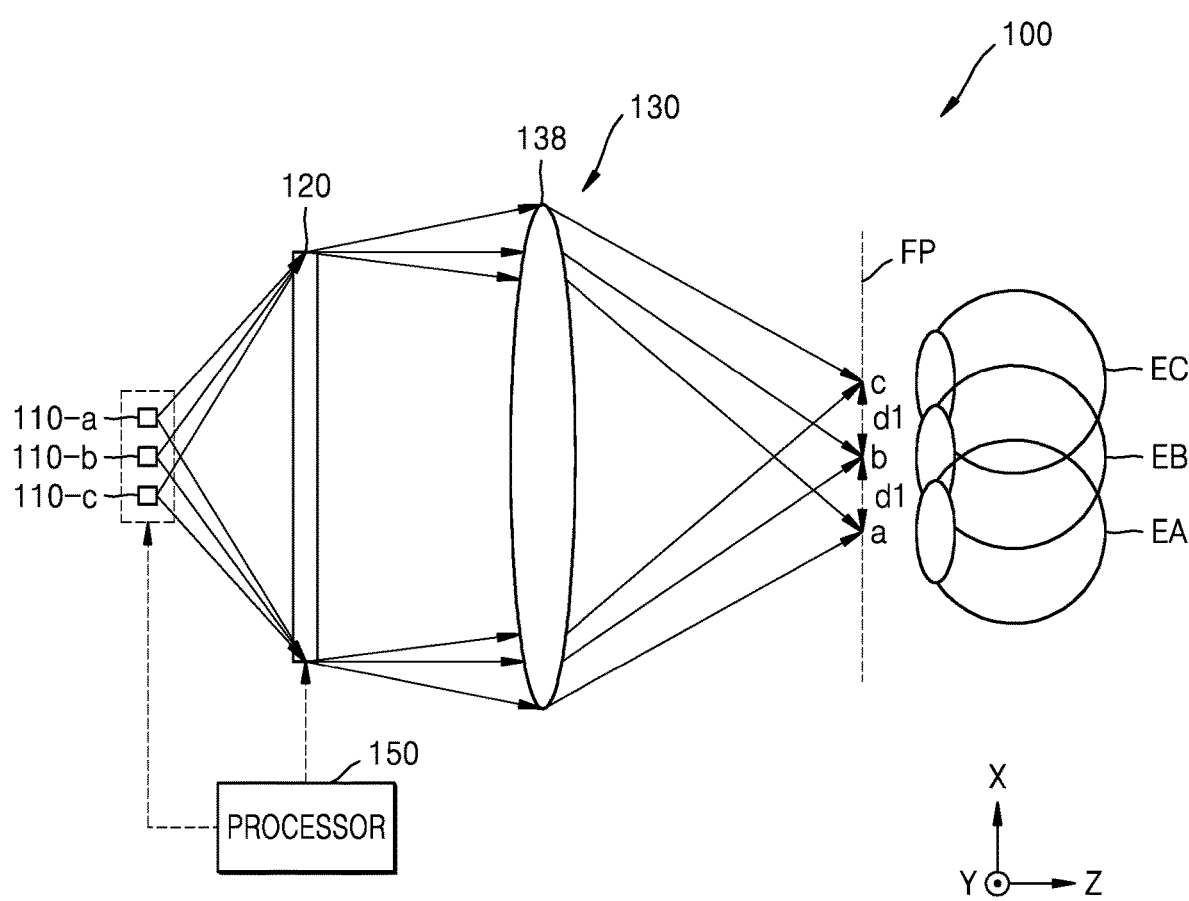
FIG. 1 is a diagram showing an optical arrangement of a three-dimensional (3D) image display apparatus according to an example embodiment.

Reference will now be made in detail to example embodiments which are illustrated in the accompanying drawings, wherein like reference numerals refer to like elements throughout. In this regard, the present embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items.

Hereinafter, example embodiments of the present disclosure will be described with reference to the accompanying drawings. In the drawings, the sizes of elements may be exaggerated for clarity of illustration. The example embodiments described herein are for illustrative purposes only, and various modifications may be made therein.

In the following description, when an element is referred to as being "above" or "on" another element, it may be directly on the other element while making contact with the other element or may be above the other element without making contact with the other element.

As used herein, the singular forms "a," "an" and "the" are intended to include the plural forms as well, unless the context clearly indicates otherwise. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in any appropriate order unless explicitly described in terms of order or described to the contrary. That is, operations are not limited to the order in which the operations are described. In the present disclosure, examples or exemplary terms (for example, "such as" and "etc.") are used for the purpose of description and are not intended to limit the scope of the inventive concept unless defined by the claims.

Figure 2A:
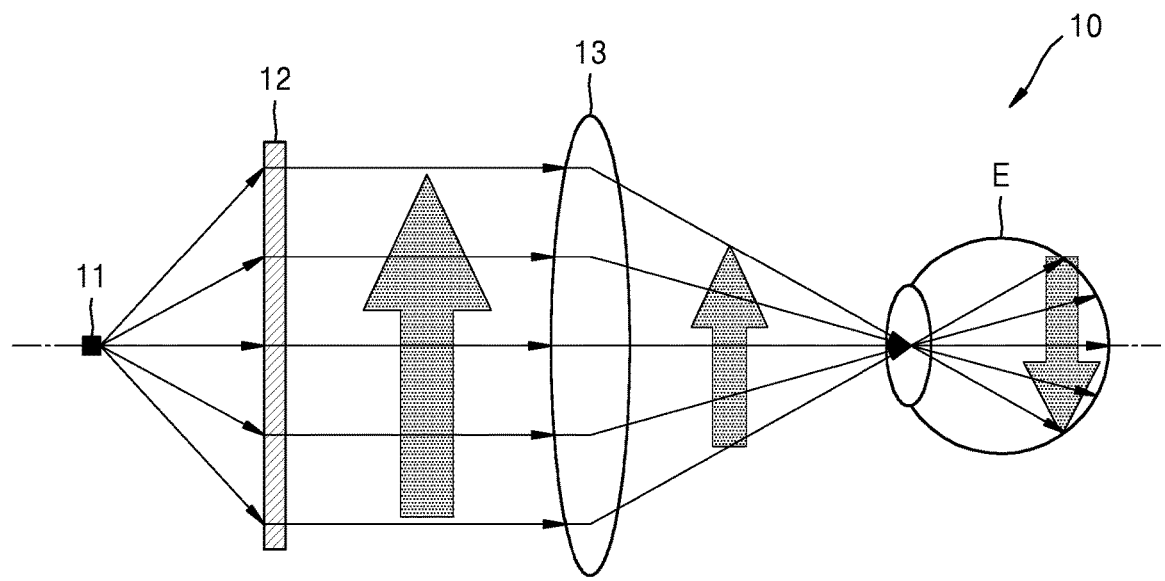
FIGS. 2A and 2B show optical arrangements of a 3D image display apparatus according to comparative examples in which eye positions of a user are different.
Figure 2B:
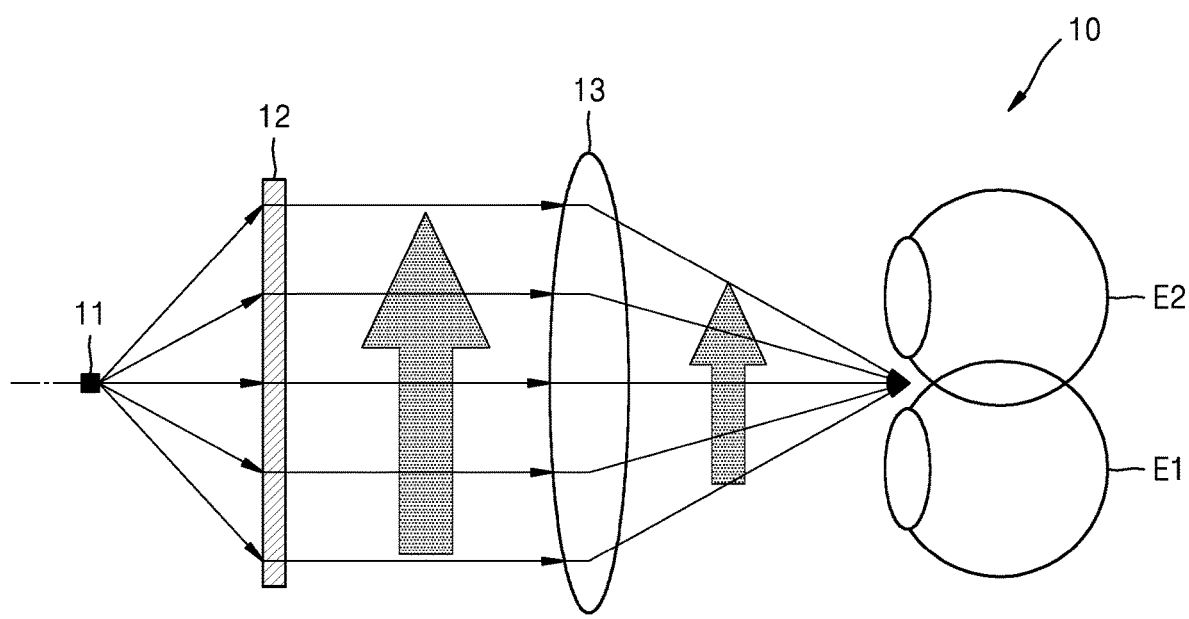
Figure 3A:
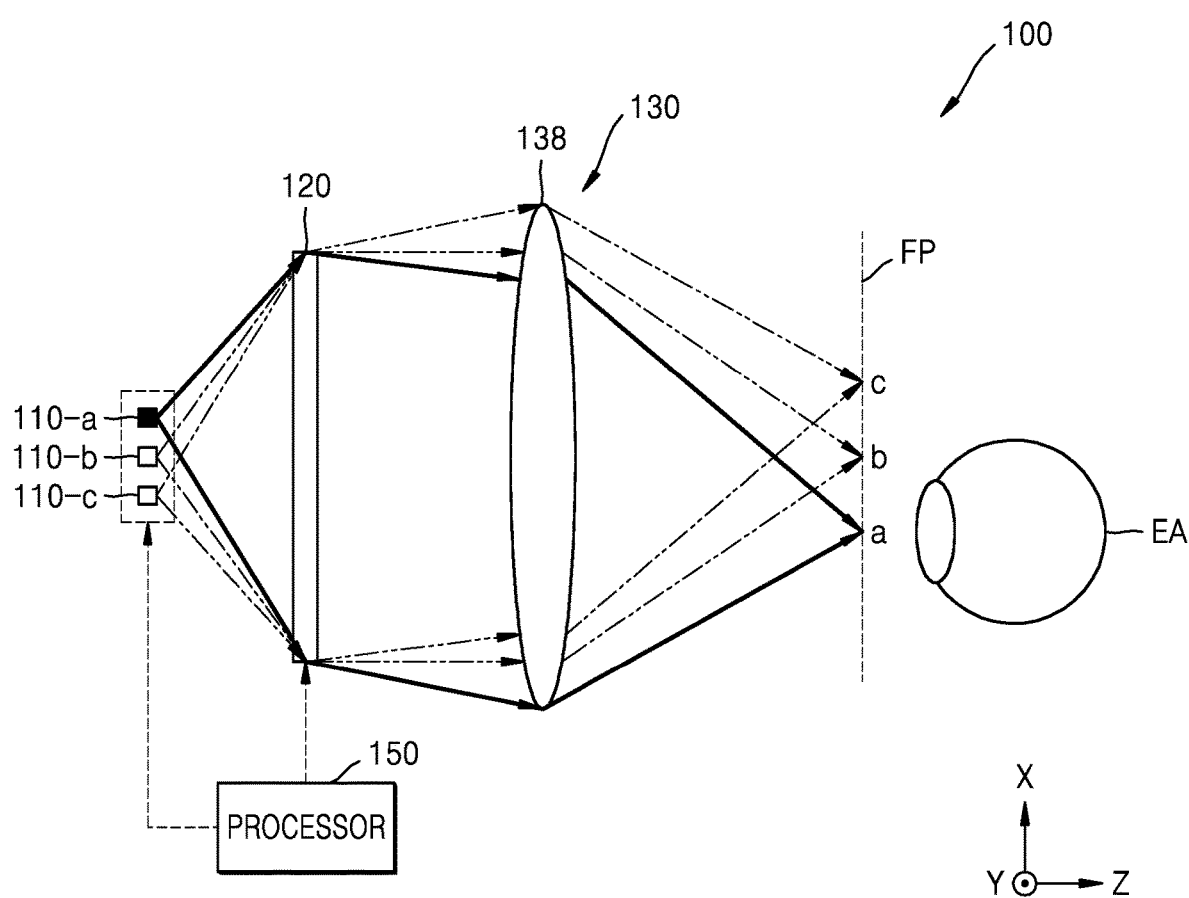
FIGS. 3A to 3C show that driving light sources are selected differently according to eye positions of a user in the 3D image display apparatus of FIG. 1.
Figure 3B:
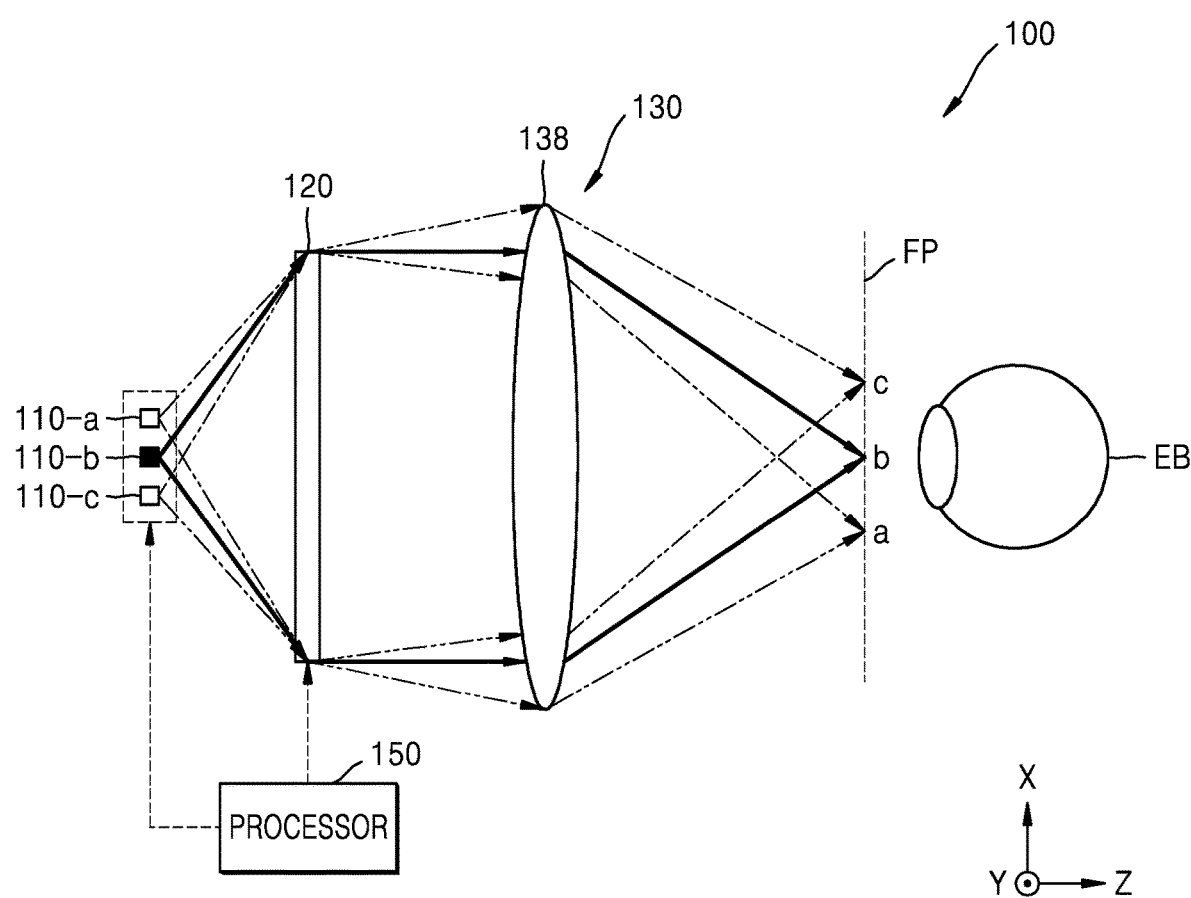
Figure 3C:
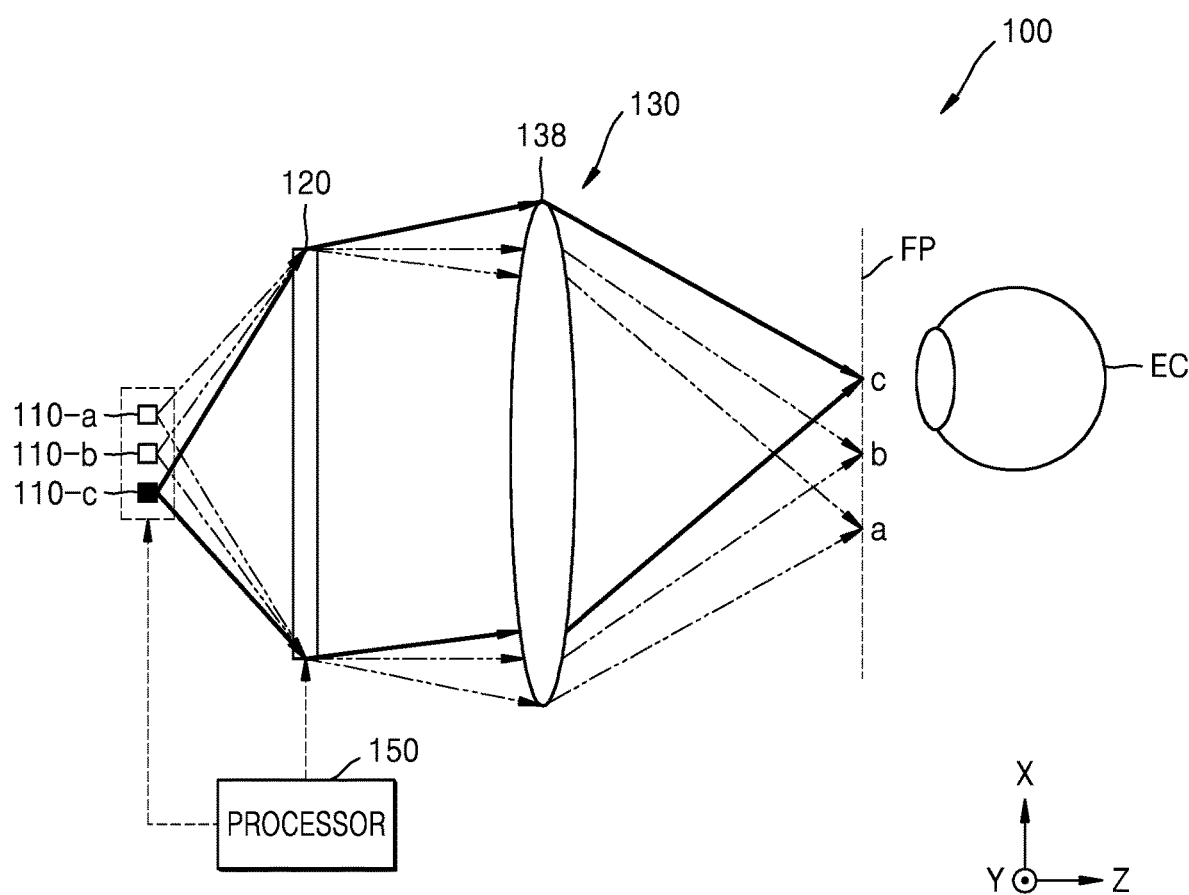

FIG. 1 is a diagram showing an optical arrangement of a three-dimensional (3D) image display apparatus 100 according to an example embodiment. FIGS. 2A and 2B show optical arrangements of a 3D image display apparatus according to comparative examples in which eye positions of a user are different. FIGS. 3A to 3C show that driving light sources are selected differently according to eye positions of a user in the 3D image display apparatus 100 of FIG. 1.

Referring to FIG. 1, the 3D image display apparatus 100 may include a plurality of light sources 110-*a*, 110-*b*, and 110-*c* disposed to respectively form focal points a, b, and c at different positions on a predetermined focal plane FP, a spatial light modulator 120 modulating light emitted by the light sources 110-*a*, 110-*b* and 110-*c* according to 3D image information, a focusing optical system 130 focusing an image formed in the spatial light modulator 120 onto the focal plane FP, and a processor 150 selecting and driving at least one of the plurality of light sources 110-*a*, 110-*b*, and 110-*c* and controlling a modulation signal applied to the spatial light modulator 120.

The plurality of focal points a, b, and c may be spaced apart from each other on the focal plane FP and may be aligned along a direction (an X direction) perpendicular to an optical axis direction (a Z direction) as shown in FIG. 1. The plurality of light sources 110-*a*, 110-*b*, and 110-*c* may be disposed such that a distance d1 between the plurality of focal points a, b, and c is similar to or greater than a pupil size. By disposing the plurality of light sources 110-*a*, 110-*b*, and 110-*c* as described above, an appropriate light source may be selected considering the eye positions of a user, and thus, a field of view may be broadened, as compared to a comparative example, such as illustrated in FIGS. 2A and 2B.

Three light sources 110-*a*, 110-*b*, and 110-*c* are shown as being arranged in the X direction, which will be described below, but the disclosure is not limited thereto. In another example embodiment, a number of light sources greater than three may be provided. Additionally, the plurality of light sources may be arranged in a two-dimensional (2D) array. That is, the plurality of light sources may be spaced apart from each other along the X and Y directions on a plane X-Y perpendicular to the optical axis direction (the Z direction). In this case, the p plurality of focal points of the plurality of light sources may be spaced apart from each other in the X direction and an Y direction on the focal plane FP, and the field of view may be broadened two-dimensionally.

A 3D image display apparatus 10 according to the comparative examples shown in FIGS. 2A and 2B may include a light source 11 providing light, a spatial light modulator 12 modulating light from the light source 11 according to image information, and a focusing optical system 13 focusing the light modulated by the spatial light modulator 12 onto a focal plane.

The focusing optical system 13 may be a Maxwellian-view optical system. With such an optical system, an image may be focused at one point on the pupil and may thereby form the image over the user's retina, and thus, an image with high luminance may be provided without depending on the vision of the user.

However, as shown in FIG. 2B, the user may not recognize the image when the focal point including the image information does not enter the user's pupil due to the eye positions of the user.

The 3D image display apparatus 100 according to an example embodiment may have an optical system configuration capable of forming a plurality of focal points near the pupil to thereby enlarge an area in which an image may be observed.

Referring again to FIG. 1, components of the 3D image display apparatus 100 will be described in detail.

A light emitting diode (LED), a laser diode (LD), an organic light emitting diode (OLED), or the like may be used as each of the light sources 110-a, 110-b, and 110-c. When the 3D image display apparatus 100 is a holographic display apparatus, light sources 110-a, 110-b, and 110-c may each be a light source having high coherence such as laser or any other light source capable of providing the spatial light modulator 120 with light having spatial coherence of more than a predetermined level.

The light sources 110-a, 110-b and 110-c may be arranged to form the different focal points a, b and c on the predetermined focal plane FP near the eyes of the user. A light source that forms a focal point capable of providing the clearest image in relation to user's eyes EA, EB, and EC which may exist at different positions among the focal points a, b, and c may be selected as a driving light source. The light sources 110-a, 110-b, and 110-c may be arranged such that the distance d1 between the adjacent focal points a, b, and c is similar to or greater than the pupil size, and thus any one of the focal points a, b, and c may correspond to one pupil of the user's eyes EA, EB, and EC of in any of various positions. Allowing one focal point to correspond to one pupil may be facilitated in that a 3D image may be formed by selecting one of the plurality of light sources 110-a, 110-b, and 110-c as the driving light source. However, the disclosure is not limited thereto. The distance d1 may be approximately about 2 mm or more. The distance d1 may be about 4 mm or more and 10 mm or less.

In FIG. 1, the focal plane FP is shown as being located outside the pupil of the user's eyes EA, EB, and EC, but this is just an example and the focal plane FP may be formed near the user's pupil. For example, the focal plane FP may be formed at a position within the pupil.

The light sources 110-a, 110-b, and 110-c may be configured to provide light of the same wavelength band. The driving light source may be more easily selected by providing the same image at the plurality of focal points a, b, and c at the same moment. The light sources 110-a, 110-b, and 110-c may be configured such that a wavelength band of light provided by the light source 110-a, a wavelength band of light provided by the light source 110-b, and a wavelength band of light provided by the light source 110-c are the same. In FIG. 1, each of the light sources 110-a, 110-b, and 110-c is a single light source, but the disclosure is not limited thereto. Each of the light sources 110-a, 110-b, and 110-c may include a plurality of lasers or an array of light emitting diodes.

Each of the light sources 110-a, 110-b, and 110-c may include light of different wavelength bands. That is, the light source 110-a may include light emitting elements that provide light in red R, green G, and blue B wavelength bands, and the light source 110-b may also include light emitting elements that provide the light in the red R, green G, and blue B wavelength bands to provide the light of the same wavelength bands as the light source 110-a. The light source 110-c may also include light emitting elements that provide red R, green G, and blue B wavelength band lights.

From among the light sources 110-a, 110-b, and 110-c, a light source that forms a focal point at a position close to the user's eyes EA, EB, and EC may be selected as a driving light source for forming a 3D image.

As shown in FIG. 3A, the light source 110-a that forms a focal point at a position closest to the user's eye EA may be selected as the driving light source. That is, the light sources 110-b and 110-c may be turned off, and only the light source 110-a may be turned on, and the 3D image may be formed using the light of the light source 110-a. Referring to FIG. 3B, the light source 110-b that forms a focal point at a position closest to the user's eye EB may be selected as the driving light source. That is, the light sources 110-a and 110-c may be turned off, and only the light source 110-b may be turned on, and the 3D image may be formed using the light of the light source 110-b. Referring to FIG. 3C, the light source 110-c that forms a focal point at a position closest to the user's eye EC may be selected as the driving light source. That is, the light sources 110-a and 110-b may be turned off, and only the light source 110-c may be turned on, and the 3D image may be formed using the light of the light source 110-c.

The spatial light modulator 120 may be controlled by the processor 150 and may modulate the light from the light sources 100_a, 100_b, and 100_c according to a 3D image signal. The spatial light modulator 120 may form a hologram pattern by diffracting and modulating incident light according to a hologram data signal. The spatial light modulator 120 may use any one of a phase modulator capable of performing only phase modulation, an amplitude modulator capable of performing only amplitude modulation, and a complex modulator capable of performing both phase modulation and amplitude modulation. Although the spatial light modulator 120 in FIG. 1 is described as being a transmission type spatial light modulator, a reflection type spatial light modulator may be used. Regarding the transmission type spatial light modulator, the spatial light modulator 120 may use a semiconductor modulator based on a compound semiconductor such as GaAs, or a liquid crystal device (LCD). In the reflection type spatial light modulator, the spatial light modulator 120 may use, for example, a digital micromirror device (DMD), liquid crystal on silicon (LCoS), or a semiconductor modulator.

The focusing optical system 130 may focus the image formed by the spatial light modulator 120 onto a focal plane. The focusing optical system 130 is shown as one lens 138, but this is exemplary. The focusing optical system 130 may include a plurality of lenses. The focusing optical system 130 may be configured as a Maxwellian view optical system that focuses image information at a point in the user's pupil.

The processor 150 may control the overall operation of the 3D image display apparatus 100. The processor 150 may control the plurality of light sources 100_a, 100_b, and 100_c and the spatial light modulator 120 to select one or more of the plurality of light sources 100_a, 100_b, and 100_c according to the positions of the user's eyes EA, EB, and EC, and form the 3D image using the selected light source. For example, the processor 150 may control the plurality of light sources 100_a, 100_b, and 100_c and the spatial light modulator 120 to sequentially blink the plurality of light sources 100_a, 100_b, and 100_c, modulate the light of each of the plurality of light sources 100_a, 100_b, and 100_c by using the spatial light modulator 120, and form the plurality of focal points a, b, and c on the focal plane FP. Also, from among the plurality of light sources 100_a, 100_b, and 100_c, a light source that focuses a focal point on a pupil position of the user may be selected as the driving light source.

When the driving light source is selected, the processor 150 may control the spatial light modulator 120 to form the 3D image using light of the selected driving light source by turning off unselected light sources and allowing only the selected driving light source to be in an ON state.

An operation performed by the 3D image display apparatus 100 of forming a 3D image will now be described. Hereinafter, although the 3D image display apparatus 100 is described as being a holographic display apparatus, this is just an example and the disclosure is not limited thereto.

The hologram data signal may be generated by the processor 150 and provided to the spatial light modulator 120. The hologram data signal may be a computer generated hologram (CGH) signal computed to reproduce a desired hologram image on a space. The processor 150 may generate the hologram data signal according to the hologram image to be reproduced. The spatial light modulator 120 may form the hologram pattern on a surface of the spatial light modulator 120 according to the hologram data signal provided from the processor 150. An operating principle of the spatial light modulator 120 to form the hologram pattern may be, for example, the same as an operating principle of a display panel that displays an image. In an example embodiment, the hologram pattern may be displayed on the spatial light modulator 120 in the form of an interference pattern having information of the hologram image to be reproduced.

Simultaneously, the light source selected as the driving light source, from among the light sources 110-a, 110-b, and 110-c, may provide the light to the spatial light modulator 120. The light incident on the spatial light modulator 120 may be diffracted and interfered by the hologram pattern formed in the spatial light modulator 120. The diffracted and interfered light may be focused on the focal plane FP of the focusing optical system 130 such that a three dimensional hologram image may be reproduced on a predetermined space in front of the spatial light modulator 120. The shape and depth of the hologram image to be reproduced may be determined according to the hologram pattern formed in the spatial light modulator 120.

Since the light sources 110-a, 110-b, and 110-c are arranged to form focal points at different positions on the focal plane FP close to the user's eyes EA, EB, and EC, which may be at various positions, a range for the user to observe the image, i.e., a viewing window, may be enlarged.

Figure 4:
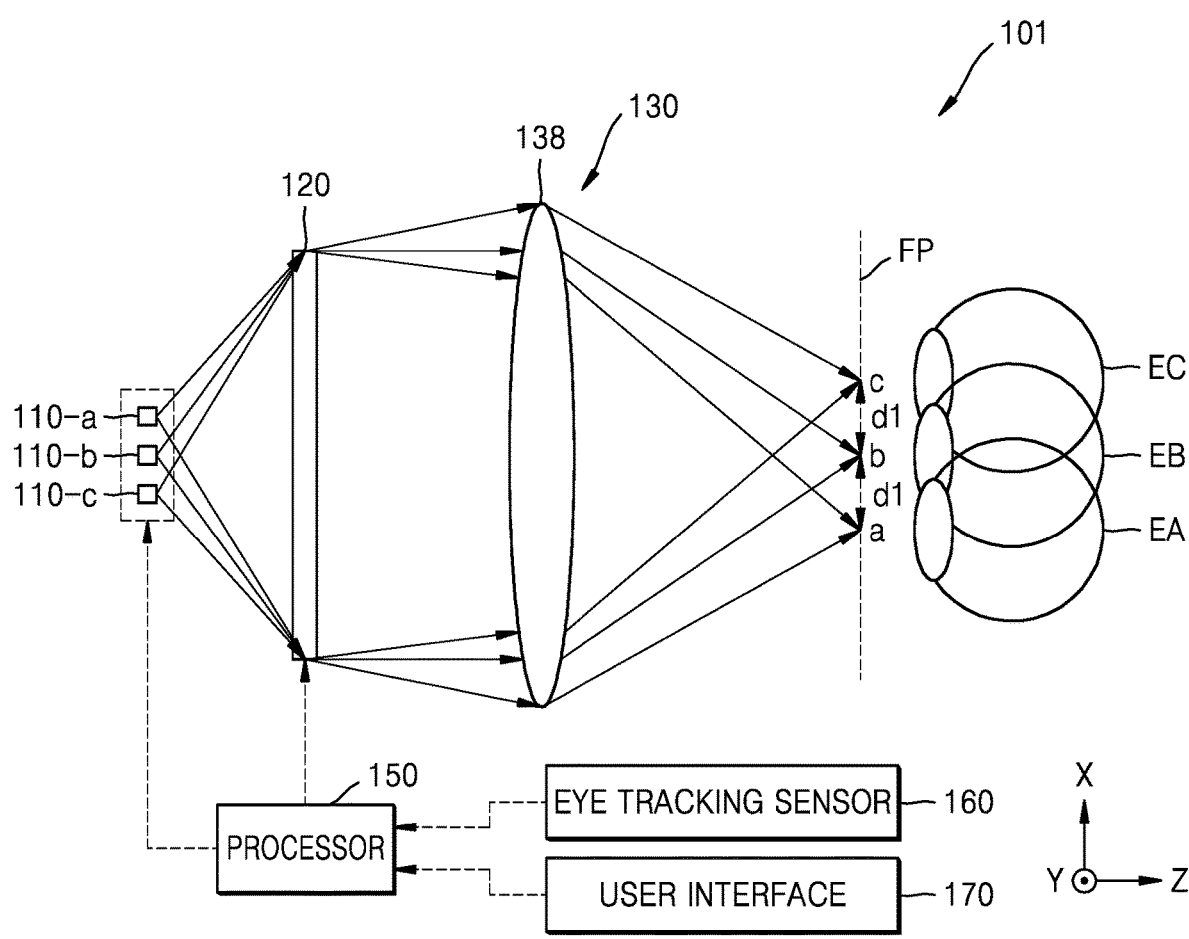
FIG. 4 is a diagram showing an optical arrangement of a 3D image display apparatus according to another example embodiment.

FIG. 4 is a diagram showing an optical arrangement of a 3D image display apparatus 101 according to another example embodiment.

The 3D image display apparatus 101 may further include an eye tracking sensor 160 and/or a user interface 170, as compared to the 3D image display apparatus 100 of FIG. 1.

The eye tracking sensor 160 may sense an amount of reflection at each moment when the plurality of light sources 110-a, 110-b, and 110-c sequentially blink to form the plurality of focal points a, b, and c. The processor 150 may select a driving light source based on a detection signal of the eye tracking sensor 160. For example, the processor 150 may select, from a signal sensed by the eye tracking sensor 160, a light source operating at an instant at which an amount of front reflection is the greatest as the driving light source.

The processor 150 may also select the driving light source according to an input signal of a user. When the plurality of light sources 110-a, 110-b, and 110-c sequentially blink to form the plurality of focal points a, b, and c, the user may select a time at which the clearest image is provided. The processor 150 may select a light source operating at the time selected by the user as the driving light source.

Figure 5:
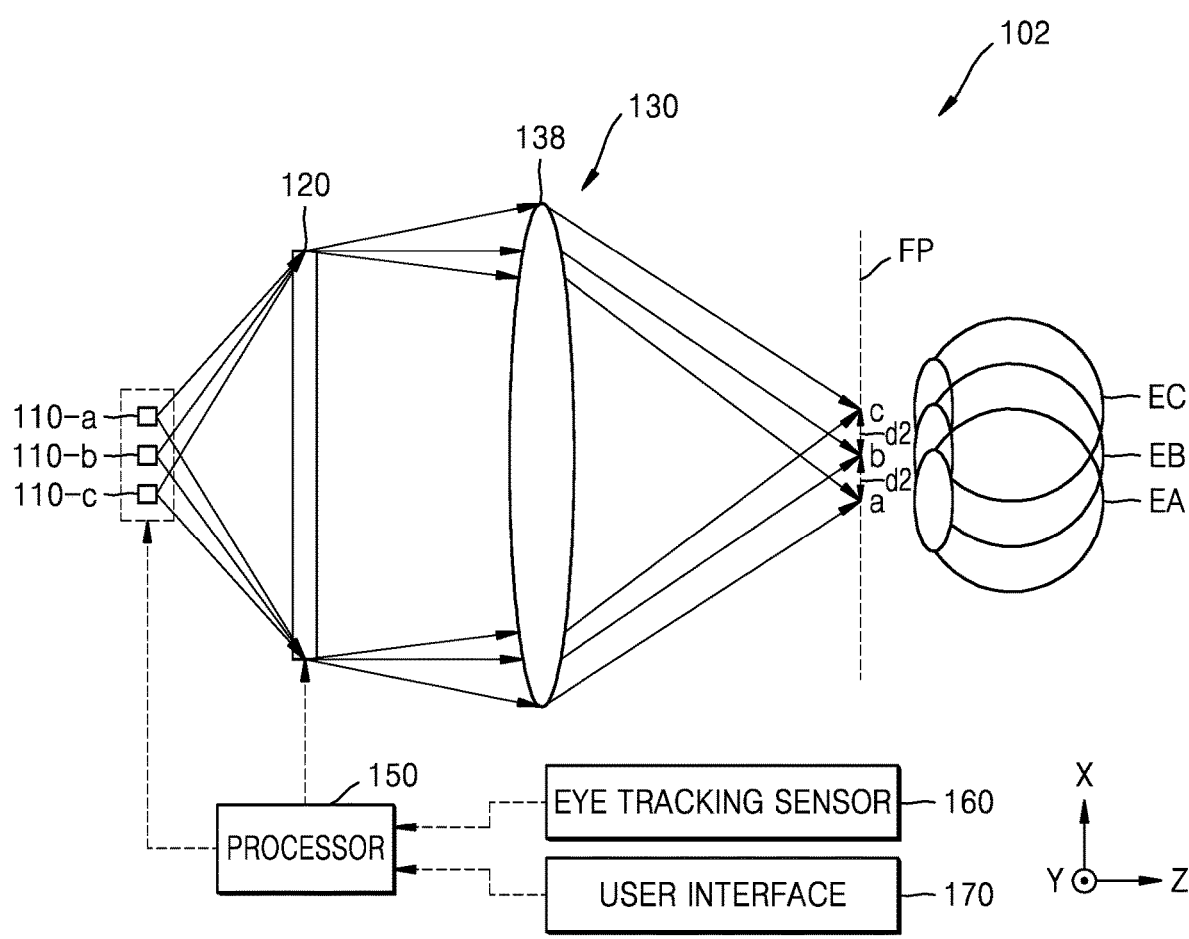
FIG. 5 is a diagram showing an optical arrangement of a 3D image display apparatus according to another example embodiment.
Figure 6A:
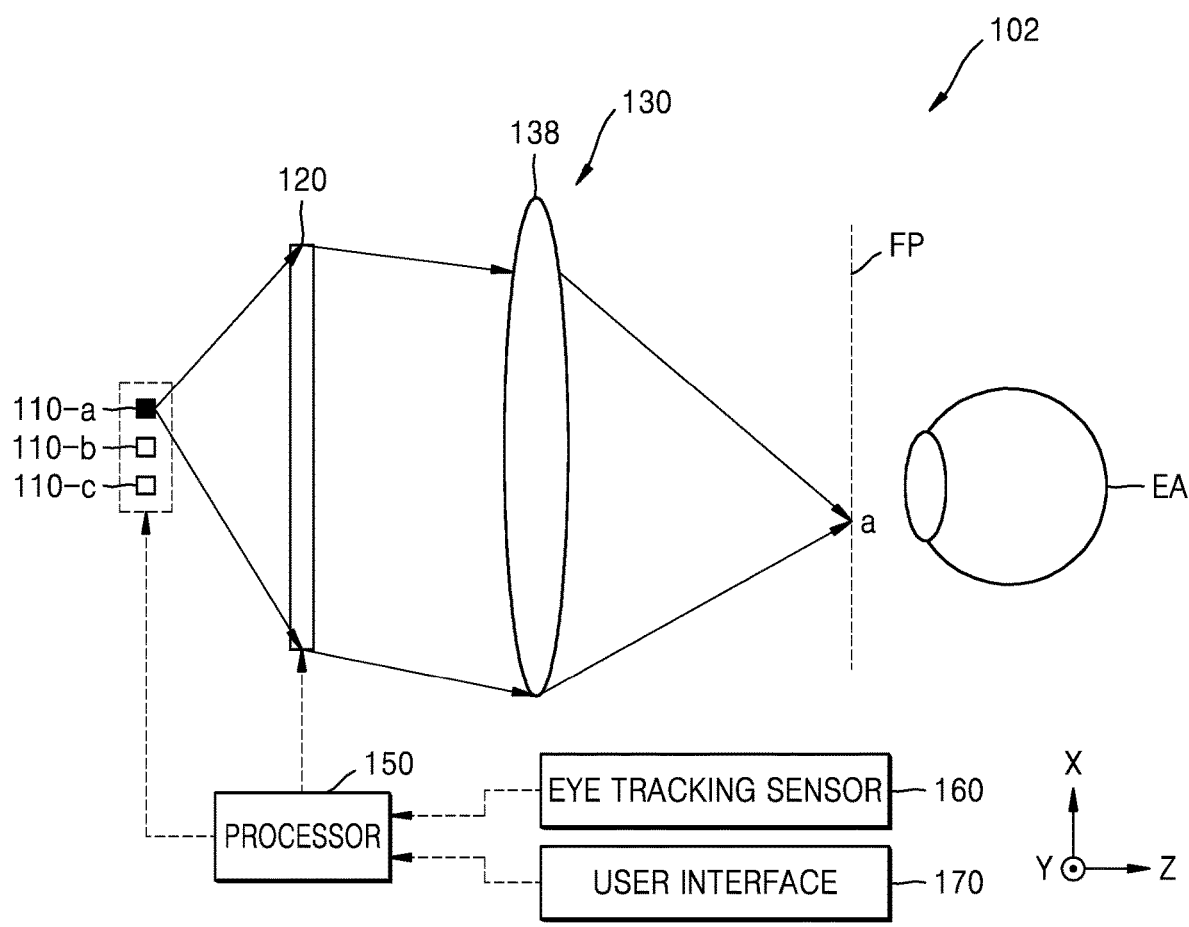
FIGS. 6A and 6B show cases where a plurality of driving light sources are selected according to eye positions of a user in the 3D image display apparatus of FIG. 5.
Figure 6B:
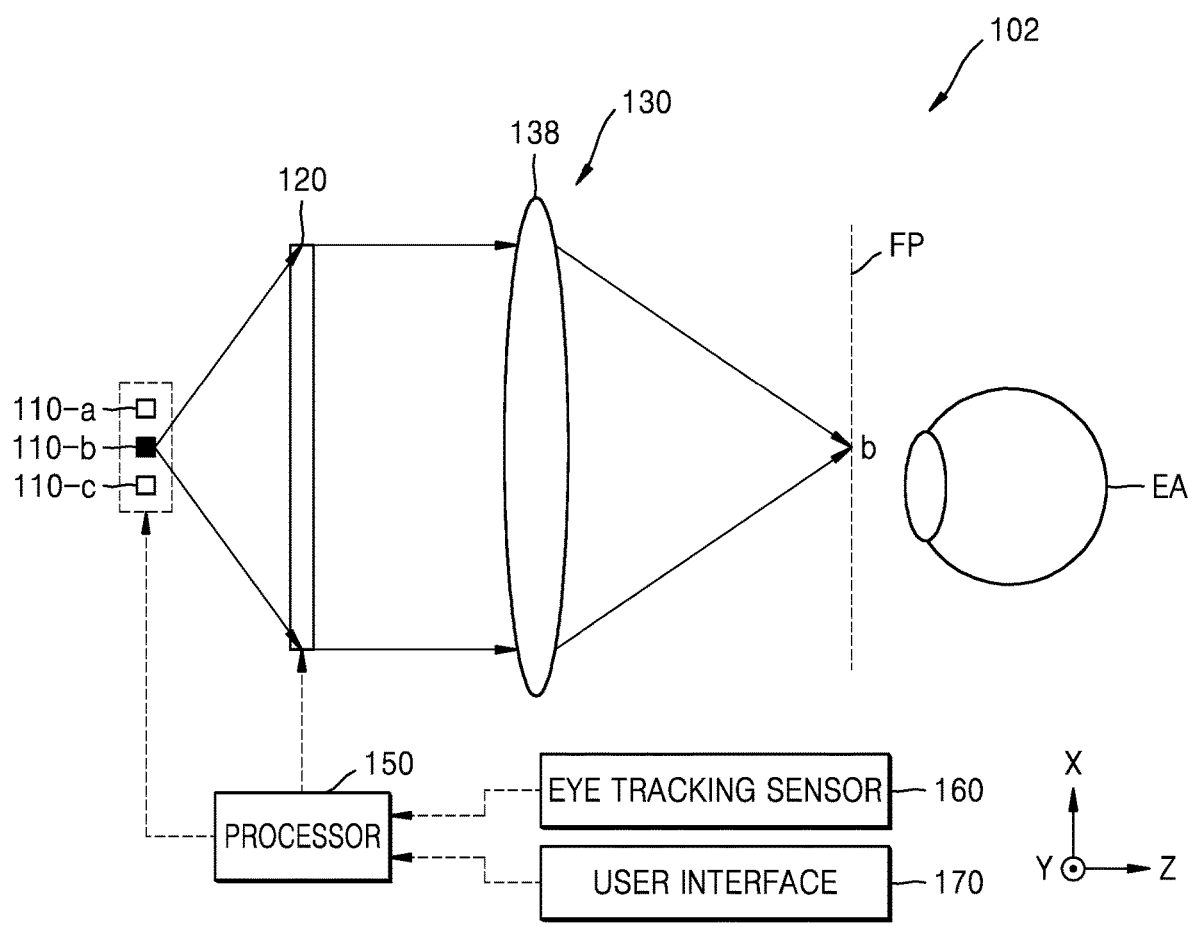

FIG. 5 is a diagram showing an optical arrangement of a 3D image display apparatus 102 according to another example embodiment. FIGS. 6A and 6B show cases in which a plurality of driving light sources are selected according to eye positions of a user in the 3D image display apparatus 102 of FIG. 5.

In the 3D image display apparatus 102, a distance d2 between the plurality of focal points a, b, and c may be smaller than the pupil size. The distance d2 may be about 6 mm or less. The distance d2 may be about 2 mm or more and 10 mm or less. In this case, two focal points may correspond to a single pupil. In this case, the user may recognize a dual image. Thus, a driving method that can prevent this may be desired. Also, as shown in FIG. 1, even when the distance d1 between the plurality of focal points a, b, and c is set larger than a general pupil size, it may be desirable to drive the 3D image display apparatus 101 similar to the 3D image display apparatus of the current embodiment, according to an individual difference.

When two focal points correspond to a single pupil, images at the moments at which two focal points are formed respectively may be perceived clearly. In this case, the user may select two of the light sources 100_a, 100_b, and 100_c as driving light sources. However, in this case, when the two selected light sources operate simultaneously, a dual image may be recognized to the user. Accordingly, the processor 150 may control the spatial light modulator 120 to sequentially blink the two selected driving light sources and provide another image suitable for a corresponding focal point at the moment that each light source is turned on. An operation of sequentially blinking the two selected driving light sources may be performed at about 40 Hz or more such that flickering is not perceived by the user.

FIGS. 6A and 6B show the cases in which the two focal points a and b correspond to the pupil of the user's eye EA. The light sources 110-a and 110-b may be selected as driving light sources according to a selection of the user or the detection signal of the eye tracking sensor 160. In this case, the light source 110-c may remain in an OFF state, the light sources 110-a and 110-b may sequentially blink, and the light from the light sources 110-a and 110-b may be modulated by the spatial light modulator 120.

For example, as shown in FIG. 6A, the light source 110-a may be turned on at a predetermined moment, and the light of the light source 110-a may be modulated by the spatial light modulator 120 to form the focal point a.

Next, as shown in FIG. 6B, at a next moment, the light source 110-a may be turned off, the light source 110-b may be turned on, and the light of the light source 110-b may be modulated by the spatial light modulator 120 to form the focal point b.

When an operation period as shown in FIGS. 6A and 6B is set to about 40 Hz or more, the user may not recognize flickering of the two light sources 110-a and 110-b. Also, since different images suitable for two focal point positions are provided, the user may perceive a clear image rather than a dual image.

Figure 7:
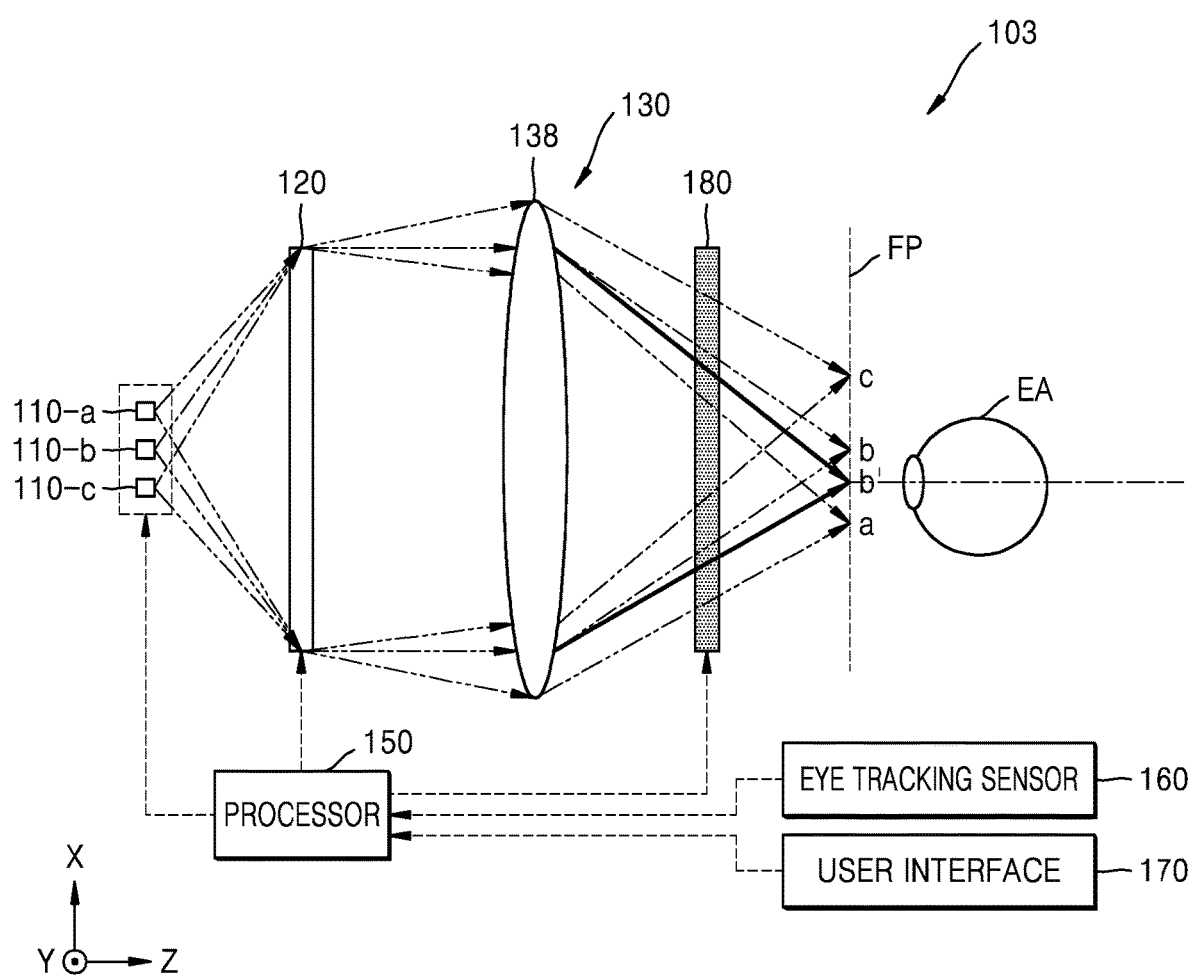
FIG. 7 is a diagram showing an optical arrangement of a 3D image display apparatus according to another example embodiment.

FIG. 7 is a diagram showing an optical arrangement of a 3D image display apparatus 103 according to another example embodiment.

The 3D image display apparatus 103 according to the present example embodiment differs from the 3D image display apparatuses 101 and 102 shown in FIGS. 4 and 5 in that the 3D image display apparatus 103 further includes a beam steering device 180.

At a position of the user's eye EA, at which none of the focal points a, b, c enters the pupil, the beam steering device 180 may be used to finely adjust a focal point position. The beam steering device 180 may adjust a direction of an output beam such that the focal point b is moved to the focal point b' as shown in FIG. 7. The beam steering device 180 is shown as disposed between the focusing optical system 130 and the focal plane FP, but is not limited thereto. The beam steering device 180 may be disposed between, for example, the light sources 110-a, 110-b, and 110-c and the spatial light modulator 120.

The beam steering device 180 is illustrated as steering the beam in an X direction perpendicular to an optical axis direction (Z direction), but is not limited thereto. The beam steering device 180 may steer the beam in the X direction and a Y direction and may finely adjust the focal point position two-dimensionally.

When a clear image is not recognized at any focal point position at an initial operation of blinking the light sources 110-a, 110-b and 110-c sequentially and forming the plurality of focal points a, b and c, the processor 150 may drive the beam steering device 180 to finely adjust positions of the focal points a, b, and c, according to an input signal of a user who uses the user interface 170 or according to a detection signal of the eye tracking sensor 160.

Figure 8:
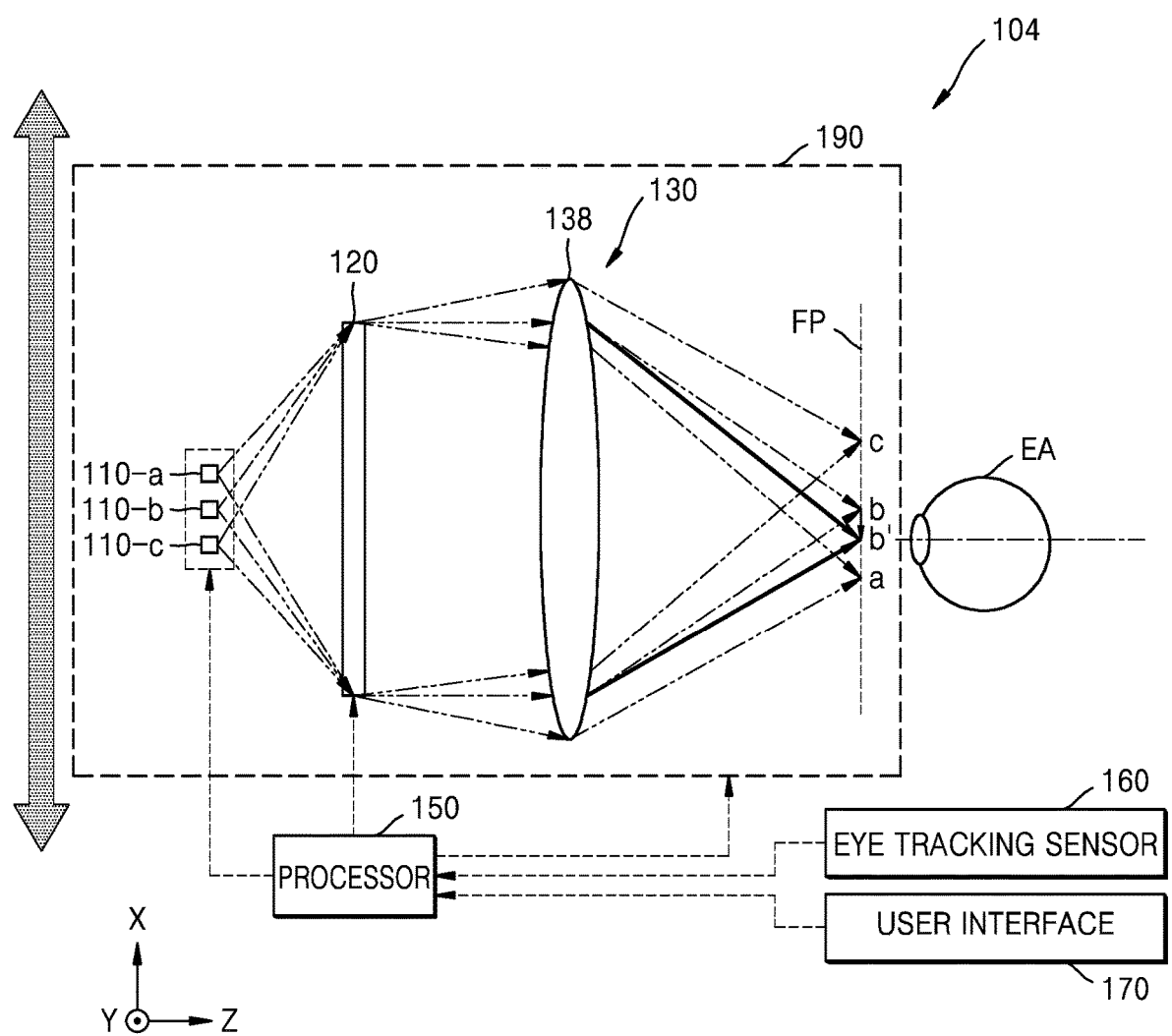
FIG. 8 is a diagram showing an optical arrangement of a 3D image display apparatus according to another example embodiment.

FIG. 8 is a diagram showing an optical arrangement of a 3D image display apparatus 104 according to another example embodiment.

The 3D image display apparatus 104 of the present example embodiment is different from the 3D image display apparatus 103 of FIG. 7 in that, in FIG. the example embodiment of FIG. 8, the plurality of light sources 110-a, 110-b, and 110-c, the spatial light modulator 120, and the focusing optical system 130 are configured to move together, to finely adjust positions of the focal points a, b, and c. That is, an optical system 190 including the plurality of light sources 110-a, 110-b, and 110-c, the spatial light modulator 120, and the focusing optical system 130 may move along a direction (X direction) perpendicular to an optical axis direction (Z direction) on the focal plane FP, and thus positions of the focal points a, b, and c may be adjusted. As shown in FIG. 8, for example, the focal point b may be moved to a focal point b' to correspond to the pupil of the user's eye EA.

The optical system 190 is illustratively described as moving along the X direction and is not limited thereto. The optical system 190 may move along the Y direction, i.e., the focal point position may be finely adjusted two-dimensionally.

When a clear image is not recognized at any focal point position at an initial operation of blinking the light sources 110-a, 110-b and 110-c sequentially and forming the plurality of focal points a, b and c, the processor 150 may control the optical system 190 to move to finely adjust the positions of the focal points a, b, and c, according to an input signal of a user who uses the user interface 170 or according to a detection signal of the eye tracking sensor 160.

The 3D image display apparatus 103 of FIG. 7 and the 3D image display apparatus 104 of FIG. 8 may be combined with each other for fine adjustment of the focal point position. In other words, it is possible to adopt a configuration in which the beam steering device 180 is provided and a configuration in which the optical system 190 may be moved, together. An operation of the beam steering device 180 and an operation of a moving of the optical system 190 may be combined to form a focal point at a wanted position.

Figure 9:
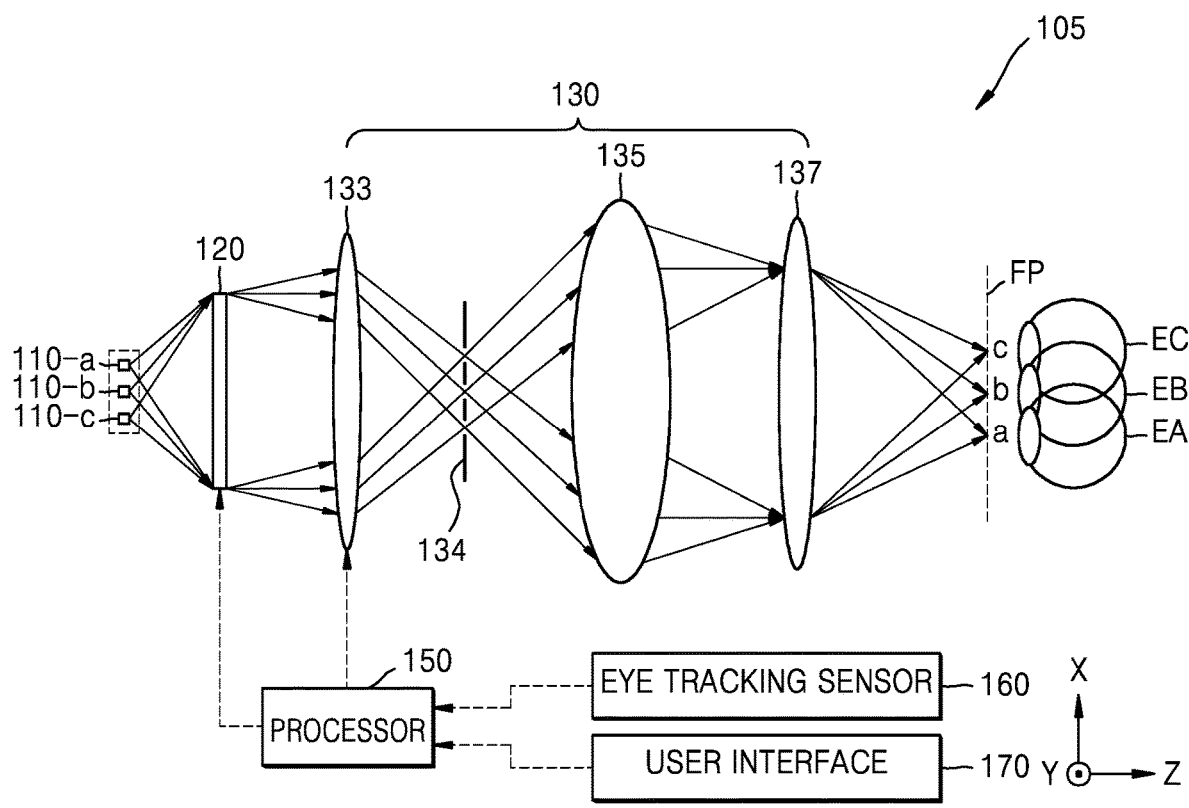
FIG. 9 is a diagram showing an optical arrangement of a 3D image display apparatus according to another example embodiment.

FIG. 9 is a diagram showing an optical arrangement of a 3D image display apparatus 105 according to another example embodiment.

The 3D image display apparatus 105 of the present example embodiment is different from the above-described example embodiments with respect to the configuration of the focusing optical system 130.

The focusing optical system 130 may include a spatial filter 134. The spatial filter 134 is for eliminating unwanted noise that occurs when light is modulated in the spatial light modulator 120.

When the light is modulated in the spatial light modulator 120, unwanted noise may occur. Since the general spatial light modulator 120 includes an array of a plurality of pixels, the array of the plurality of pixels may act as a lattice. Thus, for example, when the spatial light modulator 120 includes a hologram pattern for hologram image formation, the incident light may be diffracted and interfered by the pixel lattice configured as the array of the pixels of the spatial light modulator 120 as well as the hologram pattern. Also, a portion of the incident light may not be diffracted by the hologram pattern but may pass through the spatial light modulator 120 without diffraction. As a result, a large number of lattice spots may appear on the focal plane FP of the focusing optical system 130 in which the hologram image is converged to a point. These multiple lattice points may act as image noise which degrades the image quality of a hologram image and makes it uncomfortable to view the hologram image.

To block such noise, the hologram image may be formed to avoid the lattice points such that the lattice points are not visible to a user. The spatial light modulator 120 may further form a periodic diffraction pattern that adjusts a spot position of the hologram image together with the hologram pattern including information of the hologram image to be reproduced. Since the incident light is deflected in a traveling direction by the periodic diffraction pattern displayed by the spatial light modulator 120, the spot position of the hologram image may deviate from the lattice points. Meanwhile, when moving the spot position of the hologram image in this manner, a complex conjugate image may appear at a symmetrical position of the hologram image around the lattice points, and such an image may also act as noise.

The spatial filter 134 may be configured to block the lattice points and the complex conjugate image and transmit only the hologram image. As a result, the user may observe that a noise image due to the lattice points and the complex conjugate image is not visible or is less visible. The spatial filter 134 may include a plurality of openings for transmitting a plurality of hologram images. Although the same number of openings as the number of the plurality of light sources 110-a, 110-b, and 110-c is illustrated, this is merely exemplary and the disclosure is not limited thereto. To remove noise generated when light of each of the plurality of light sources 110-*a*, 110-*b*, and 110-*c* is modulated in the spatial light modulator 120, a plurality of openings corresponding to each of the plurality of light sources 110-*a*, 110-*b*, and 110-*c* may be formed in the spatial filter 134, in other words, more openings than the number of plurality of light sources 110-*a*, 110-*b*, and 110-*c* may be formed in the spatial filter 134.

The focusing optical system 130 may include a first lens 133, a second lens 135 and a third lens 137 for focusing the light onto the focal plane FP. The spatial filter 134 may be disposed between the first lens 133 and the second lens 135. The spatial filter 134 may be disposed on the focal plane FP of the first lens 133. In this case, positions of the plurality of openings of the spatial filter 134 may coincide with spot positions of a plurality of hologram images. The number of the lenses illustrated in FIG. 9 is exemplary and the disclosure is not limited thereto. In case that a noise-eliminated image can be focused onto the focal plane FP by using two lenses of the first lens 133 and the second lens 135 or the first lens 133 and the third lens 138, the other lens may be omitted.

Figure 10:
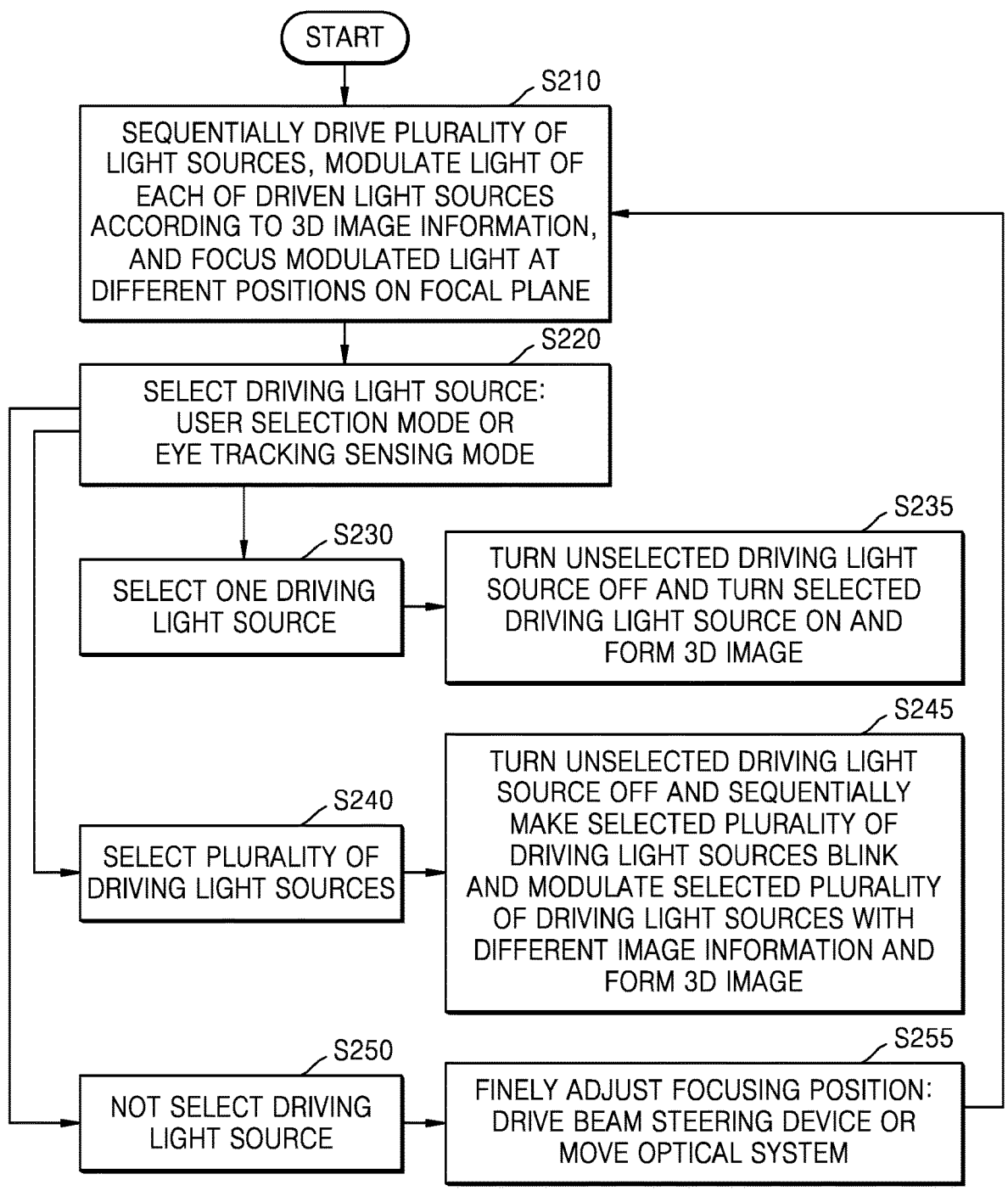
FIG. 10 is a flowchart for schematically explaining a 3D image display method according to an example embodiment.

FIG. 10 is a flowchart for schematically explaining a 3D image display method according to an example embodiment.

The 3D image display method according to an example embodiment may be performed using any one of the 3D image display apparatuses 100, 101, 102, 103, and 104 of the above-described example embodiments, but the disclosure is not limited to thereto. The 3D image display method may be performed using a modified 3D image display apparatus as long as the 3D image display method to be described may be performed.

In the case of a 3D image display, a plurality of light sources may be sequentially driven and light of each of the driven light sources may be modulated according to 3D image information and focused on a predetermined focal point position (S210). This operation is performed for selecting a light source capable of providing a clear image according to an eye position of a user. To this end, the plurality of light sources may be arranged such that respective focal points are formed at different positions on a predetermined focal plane, and thus, a focusing optical system may be used.

Next, driving light source selection may be performed (S220). This operation may be performed in a user selection mode in which the user selects and inputs a driving light source or in an eye tracking sensing mode selected by a processor according to a sensing signal of an eye tracking sensor.

In this operation, from among the plurality of light sources, a light source that focuses on a pupil position of the user may be selected as a driving light source. This operation may me omitted after operation S210 is completed, or may be performed simultaneously with the operation S210 or with a slight time difference from the operation S210. In an example embodiment, the user may select a light source providing the clearest image after an operation of forming a focal point by light of each of the plurality of light sources is completed, but also even in a state in which the driving of all of the plurality of light sources is not finished, the user may select a light source that is determined to provide a sufficiently clear image, and an operation of forming the focal point by light of each of other light sources may be omitted, and operation S210 may stop.

One or a plurality of driving light sources may be selected.

When one driving light source is selected (S230), an unselected light source may be turned off and the selected light source may be turned on to form a 3D image (S235).

When a plurality of driving light sources are selected (S240), the unselected light sources may be turned off, and the selected plurality of driving light sources may sequentially blink and may be modulated with different image information to form the 3D image (S245). When the plurality of drive light sources are selected, a plurality of focal points may be all formed at positions corresponding to the pupil of the user such that a clear image of a similar degree is formed at two focal point positions. In this case, for example, a plurality of driving light sources selected using the method described with reference to FIGS. 6A and 6B may be sequentially driven.

Although an operation of focusing the light of each of the plurality of light sources is completed, no driving light source may have been selected (S250). In the embodiment described with reference to FIGS. 7 and 8, when none of the focal points formed by each of the plurality of light sources corresponds to the pupil position of a user's eye and thus a clear image is not provided, a focusing position may be finely adjusted (S255). For fine adjustment of the focusing position, as described with reference to FIG. 7, a beam steering element may be used, or as described with reference to FIG. 8, an optical system for focal point formation, that is, an optical system including a light source, a spatial light modulator, and a focusing optical system may be moved.

After such fine adjustment, operations S210 and S220 may be performed.

The above-described 3D display apparatuses may be wearable. All or some of the components of the 3D display apparatuses may be configured to be wearable.

In an example embodiment, the 3D display apparatuses may be used as a head-mounted display (HMD). In another example embodiment, the 3D display apparatuses may be used as a glasses-type display or a goggle-type display.

3D display apparatuses may interact with or operate in connection with other electronic devices such as smartphones. In an example embodiment, a processor of the 3D display apparatus may be included in a smartphone. In another example embodiment, the 3D display apparatus described above may be included in a smartphone, and the smartphone itself may be used as a 3D display apparatus.

According to one or more of the above-described example embodiments, a space for viewing an image, that is, a viewing window, may be enlarged. Thus, a user may observe the image within an enlarged area.

The above-described example embodiments may be applied to any of various applications such as a HMD, thereby providing a high-quality image to the user.

Example embodiments have been described and illustrated in the accompanying drawings to help understanding of the disclosure. However, these embodiments are merely examples not limiting the scope of the disclosure. In addition, it will be understood that the disclosure is not limited to those illustrated and described in the disclosure. That is, those of ordinary skill in the art may make various modifications therein.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A three-dimensional (3D) image display apparatus comprising:
a plurality of light sources arranged to form a respective plurality of focal points on a focal plane;
a spatial light modulator configured to modulate light from the plurality of light sources according to 3D image information;
a focusing optical system configured to focus an image formed by the spatial light modulator on the focal plane;
a beam steering device configured to adjust a position of the at least one of the respective plurality of focal points, the beam steering device provided between the focusing optical system and the focal plane; and
a processor configured to select a driving light source, of the plurality of light sources, based on a pupil position of an observer and a position of a focal point of the driving light source, to drive the driving light source, and to control a modulation signal applied to the spatial light modulator, the position of the focal point of the driving light source being closest to the pupil position of the observer among positions of the plurality of focal points.

2. The 3D image display apparatus of claim 1, wherein a distance between adjacent ones of the focal points is equal to or greater than a pupil size.

3. The 3D image display apparatus of claim 1, wherein a distance between adjacent ones of the plurality of focal points is between about 2 mm and about 10 mm.

4. The 3D image display apparatus of claim 1, wherein the plurality of light sources are configured to provide light in same wavelength band.

5. The 3D image display apparatus of claim 1, wherein the focusing optical system is a Maxwellian view optical system configured to focus image information at one point on the pupil position of the observer.

6. The 3D image display apparatus of claim 1, wherein the focusing optical system comprises:
a first lens and a second lens; and
a spatial filter disposed between the first lens and the second lens.

7. The 3D image display apparatus of claim 1, wherein the plurality of light sources, the spatial light modulator, and the focusing optical system are configured to move together to adjust a positions of the respective focal points.

8. The 3D image display apparatus of claim 1, wherein the 3D image display apparatus is a head-mounted display.

9. A three-dimensional (3D) image display apparatus comprising:
a plurality of light sources arranged to form a respective plurality of focal points on a focal plane;
a spatial light modulator configured to modulate light from the plurality of light sources according to 3D image information;
a focusing optical system configured to focus an image formed by the spatial light modulator on the focal plane;
a beam steering device configured to adjust a position of the at least one of the respective plurality of focal points, the beam steering device provided between the focusing optical system and the focal plane; and
a processor configured to select a driving light source, of the plurality of light sources, to drive the driving light source, and to control a modulation signal applied to the spatial light modulator,
wherein the processor is configured to drive the plurality of light sources sequentially, such that the plurality of light sources blink and form the respective plurality of focal points on the focal plane, and to select the driving light source, from among the plurality of light sources, that forms a focal point closest to a pupil position of a user.

10. The 3D image display apparatus of claim 9, further comprising an eye tracking sensor,
wherein the processor is configured to select the driving light source based on a detection signal of the eye tracking sensor.

11. The 3D image display apparatus of claim 9, wherein the processor is configured to select the driving light source according to an input signal of the user.

12. The 3D image display apparatus of claim 9, wherein the processor is configured to control the driving light source to be in an ON state and to control one or more light sources of the plurality of light sources which are not the driving light source to be in an OFF state and to control the spatial light modulator to form a 3D image using light of the driving light source.

13. The 3D image display apparatus of claim 9,
wherein the driving light source comprises a first driving light source and a second driving light source, and
wherein the processor is configured to make the first driving light source and the second driving light source sequentially blink and to control the spatial light modulator to form different images in synchronization with blinking of the first driving light source and the second driving light source.

14. A three-dimensional (3D) image display method comprising:
selectively driving a plurality of light sources, modulating light from the plurality of light sources according to 3D image information, and focusing the light, by a focusing optical system, thereby forming a respective plurality of focal points on a focal plane;
selecting, as a driving light source, a light source that forms a focal point closest to a pupil position of a user from among the plurality of light sources;
adjusting a position of the at least one of the respective plurality of focal points by a beam steering device provided between the focusing optical system and the focal plane; and
displaying a 3D image using light of the driving light source by controlling the driving light source to be in an ON state and controlling one or more light sources of the plurality of light sources which are not the driving light source to be in an OFF state.

15. The 3D image display method of claim 14, further comprising:
tracking the pupil position of the user,
wherein the selecting comprises selecting the driving light source based on a pupil position tracking result.

16. The 3D image display method of claim 14, further comprising:
receiving an input signal of the user,
wherein the selecting comprises selecting the driving light source according to the input signal.

17. The 3D image display method of claim 14,
wherein the selecting comprises selecting, as the driving light source, a first driving light source and a second driving light source, and
wherein the displaying comprises controlling the first driving light source and the second driving light source to sequentially blink and thereby forming different images in synchronization with blinking of the first driving light source and the second driving light source.

18. The 3D image display method of claim 14, wherein the focusing comprises using a Maxwellian view optical system configured to focus image information at one point on the user's pupil.

19. The 3D image display method of claim 14, further comprising:
finely adjusting a position of a focal point formed by at least one of the plurality of light sources.

* * * * *